(12) United States Patent
Manda

(10) Patent No.: US 7,425,126 B2
(45) Date of Patent: Sep. 16, 2008

(54) MOLDING-SYSTEM VALVE HAVING KNOCKDOWN RETAINER

(75) Inventor: Jan Marius Manda, Toronto (CA)

(73) Assignee: Husky Injection Molding Systems Ltd., Bolton, ON (CA)

( * ) Notice: Subject to any disclaimer, the term of this patent is extended or adjusted under 35 U.S.C. 154(b) by 92 days.

(21) Appl. No.: 11/435,609

(22) Filed: May 17, 2006

(65) Prior Publication Data

US 2007/0269550 A1 Nov. 22, 2007

(51) Int. Cl.
*B29C 47/36* (2006.01)
*B29C 45/54* (2006.01)

(52) U.S. Cl. .............. 425/557; 425/182; 425/190; 425/192 R; 366/82

(58) Field of Classification Search ........... 425/192 R, 425/563, DIG. 221, DIG. 224, 182, 185, 425/190, 557; 249/67, 163; 251/312; 366/80–82
See application file for complete search history.

(56) References Cited

U.S. PATENT DOCUMENTS

| | | | | |
|---|---|---|---|---|
| 3,980,013 A * | 9/1976 | Bredeson | .................... | 100/117 |
| 4,062,479 A | 12/1977 | Szabo | | |
| 4,362,496 A * | 12/1982 | Uhlig | ....................... | 425/379.1 |
| 4,447,156 A * | 5/1984 | Csongor | ....................... | 366/80 |
| 4,512,733 A | 4/1985 | Eichlseder et al. | | |
| 4,643,665 A * | 2/1987 | Zeiger | ........................ | 425/563 |
| 4,678,427 A * | 7/1987 | Fritzsche | .................... | 425/562 |
| 4,765,585 A * | 8/1988 | Wieder | ........................ | 249/64 |
| 5,044,926 A | 9/1991 | Dinerman et al. | | |
| 5,164,207 A * | 11/1992 | Durina | .................... | 425/382.4 |
| 5,258,158 A | 11/1993 | Dray | | |
| 5,513,976 A * | 5/1996 | McGrevy | .................... | 425/549 |
| 5,916,603 A * | 6/1999 | Pleasant et al. | ............. | 425/182 |
| 6,155,816 A * | 12/2000 | Urbanek et al. | ............. | 425/559 |
| 6,227,841 B1 | 5/2001 | Viron | | |
| 6,322,347 B1* | 11/2001 | Xu | ........................... | 425/376.1 |
| 6,413,076 B1* | 7/2002 | Dray, Sr. | .................... | 425/562 |
| 6,613,265 B1* | 9/2003 | Konno | ..................... | 264/328.1 |
| 6,739,863 B2* | 5/2004 | Olaru | ......................... | 425/564 |
| 2005/0233020 A1* | 10/2005 | Manda et al. | ............... | 425/146 |
| 2005/0233028 A1* | 10/2005 | Ciccone | ...................... | 425/572 |

FOREIGN PATENT DOCUMENTS

| | | |
|---|---|---|
| JP | 8281734 A | 10/1996 |
| JP | 9141709 A | 6/1997 |
| JP | 11042687 A | 2/1999 |

\* cited by examiner

*Primary Examiner*—Philip C Tucker
*Assistant Examiner*—Dimple N Bodawala

(57) ABSTRACT

Disclosed is: (i) a molding-system valve, (ii) a molding-system having a molding-system valve, and/or (iii) a method of a molding-system valve, amongst other things.

17 Claims, 9 Drawing Sheets

MOLDING-SYSTEM VALVE HAVING KNOCKDOWN RETAINER

TECHNICAL FIELD

The present invention generally relates to, but is not limited to, molding systems, and more specifically the present invention relates to, but is not limited to, (i) a molding-system valve, (ii) a molding system having a molding-system valve, and/or (iii) a method of a molding-system valve, amongst other things.

BACKGROUND

U.S. Pat. No. 5,258,158 (Inventor: Dray; Published: 1993 Nov. 2) discloses a valve for an injection-molding screw, and the valve includes a differential piston, which closes a material flow path prior to injection of a molding material.

U.S. Pat. No. 5,044,926 (Inventor: Dinerman et al; Published: 1991 Sep. 3) discloses a valve for an injection-molding machine. The valve has a rod for rotation and axial translation relative to an injection screw, with a retaining sleeve that limits axial movement of the rod.

U.S. Pat. No. 4,512,733 (Inventor: Eichlseder et al; Published: 1985 Apr. 23) discloses a valve for an extruder, with movement readily changed by a retracting-screw withdrawing pin and a replacing metering unit.

U.S. Pat. No. 4,062,479 (Inventor: Szabo; Published: 1977 Dec. 13) discloses a valve for a reciprocating screw-injection machine, the valves has a valve seat with an annular closure for effecting protuberance.

SUMMARY

It appears that known molding-system valves may be difficult to service (clean and/or replace).

In a first aspect of the present invention, there is provided a molding-system valve, including a knockdown retainer.

In a second aspect of the present invention, there is provided a molding system, having a molding-system valve that includes a knockdown retainer.

In a third aspect of the present invention, there is provided a method of a molding-system valve.

In a fourth aspect of the present invention, there is provided a molding-system device, including a valve-removal cap connectable to a barrel of a molding system, the valve-removal cap configured for removal and installation of a knockdown retainer of a molding-system valve.

A technical effect, amongst others, of the aspects of the present invention is a reduction in time associated with servicing of a molding-system valve so that a molding system may be brought back into operational mode quicker in comparison to using the known molding-system valves.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

Figure 1A:
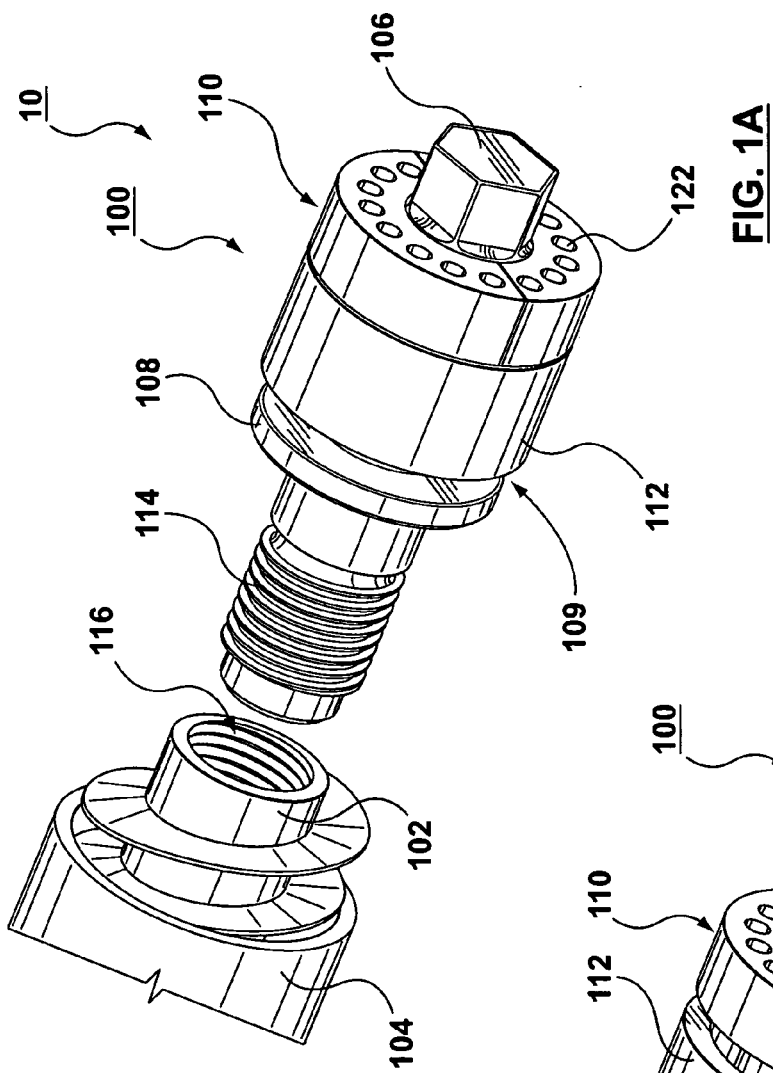
FIGS. 1A, 1B, 1C and 1D are views of a molding-system valve according to a first embodiment (which is the preferred embodiment)

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

FIGS. 1A, 1B, 1C and 1D are views of a molding-system valve 100 (hereafter referred to as "the valve 100") according to the first embodiment. The valve 100 includes a knockdown retainer 110 (hereafter referred to as "the retainer 110"). The retainer 110 is easily: (i) assembled (knocked up) to the valve 100, and/or (ii) disassembled (knocked down, dismantled) from the valve 100. The valve 100 is used in a molding system 10 examples of which are: (i) the HyPET™ System; (ii) the Quadloc™ System; (iii) the Hylectric™ System; and (iv) the Magnesium Molding System, which are all manufactured by Husky Injection Molding Systems Limited (Location: Bolton, Ontario, Canada; WWW-URL: www.husky.ca).

Preferably, the retainer 110 includes knockdown pieces 110A, 110B that: (i) interleave (dovetail, connect) with each other, and/or (ii) interleave (dovetail, connect) with a stem 106. the stem 106 includes or has a stem tip 106A that extends axially from the stem 106. The retainer 110 is a "forward" retainer 110; if the retainer 110 is a forward retainer, the retainer 110 defines (preferably), at least in part, a melt passage 122. The retainer 110 appears flush mounted in FIG. 1A.

According to a variant, the retainer 110 includes a unitary body that interleaves (dovetails, connects) with the stem 106.

During a recovery cycle of the molding system 10, the valve 100 permits an injection screw 102 (hereafter referred to as "the screw 102") to move a molding material through the valve 100 into an accumulation zone, which is positioned ahead of the valve 100. During an injection cycle of the molding system 10, the valve 100 prevents backflow of the molding material toward the screw 102 while the molding material is injected from the accumulation zone into a cavity of a mold via a nozzle (not depicted) that is attached to a barrel 104. The barrel 104 is sized to receive the screw 102. Generically, the screw 102 is also called a molding-material processing structure.

Preferably, a stem 106 extends from the screw 102. The stem 106 may also be called: a stem, a spigot, a peg, etc. The stem 106 may be: (i) integral to the screw 102 or (ii) attachable to the screw 102. Preferably, the stem 106 includes a threaded shaft 114 that mates with a threaded bore 116 of a distal end of the screw 102. The retainer 110 is knockdown joinable to the stem 106. Preferably, the retainer 110 and the stem 106 are joined by a knockdown joint 117. An example of a knockdown joint 117 is depicted in FIG. 1C. Once the retainer 110 is joined to the stem 106, the retainer 110 does not move relative to the stem 106.

A rearward retainer 108 is located rearward offset from the retainer 110, and the rearward retainer 108 extends from the stem 106. The rearward retainer 108 and the stem 106 may be:

(i) integral, and/or (ii) separable from each other. The concept of the retainer 110 is applicable to the rearward retainer 108.

A check ring 112 (hereafter referred to as "the ring 112") defines a bore so that the stem 106 is receivable in the bore of the ring 112. The retainer 110 and the rearward retainer 108 cooperate to (i) retain the ring 112, and/or (ii) to permit limited stroking of the ring 112.

FIG. 1A shows the valve 100 in which the retainer 110 is depicted in a state prior to the injection cycle of the molding system 10 in which a shot of molding material has been accumulated in the accumulation zone. The ring 112 has been made to abut the retainer 110 so that there is: (i) no gap between the ring 112 and the retainer 110, and/or (ii) a gap 109 between the ring 112 and the rearward retainer 108.

Figure 1B:
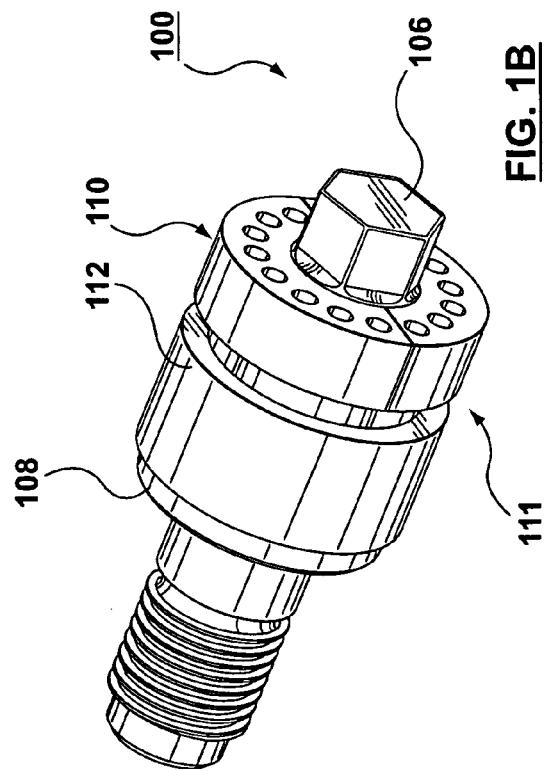
Figure 1C:
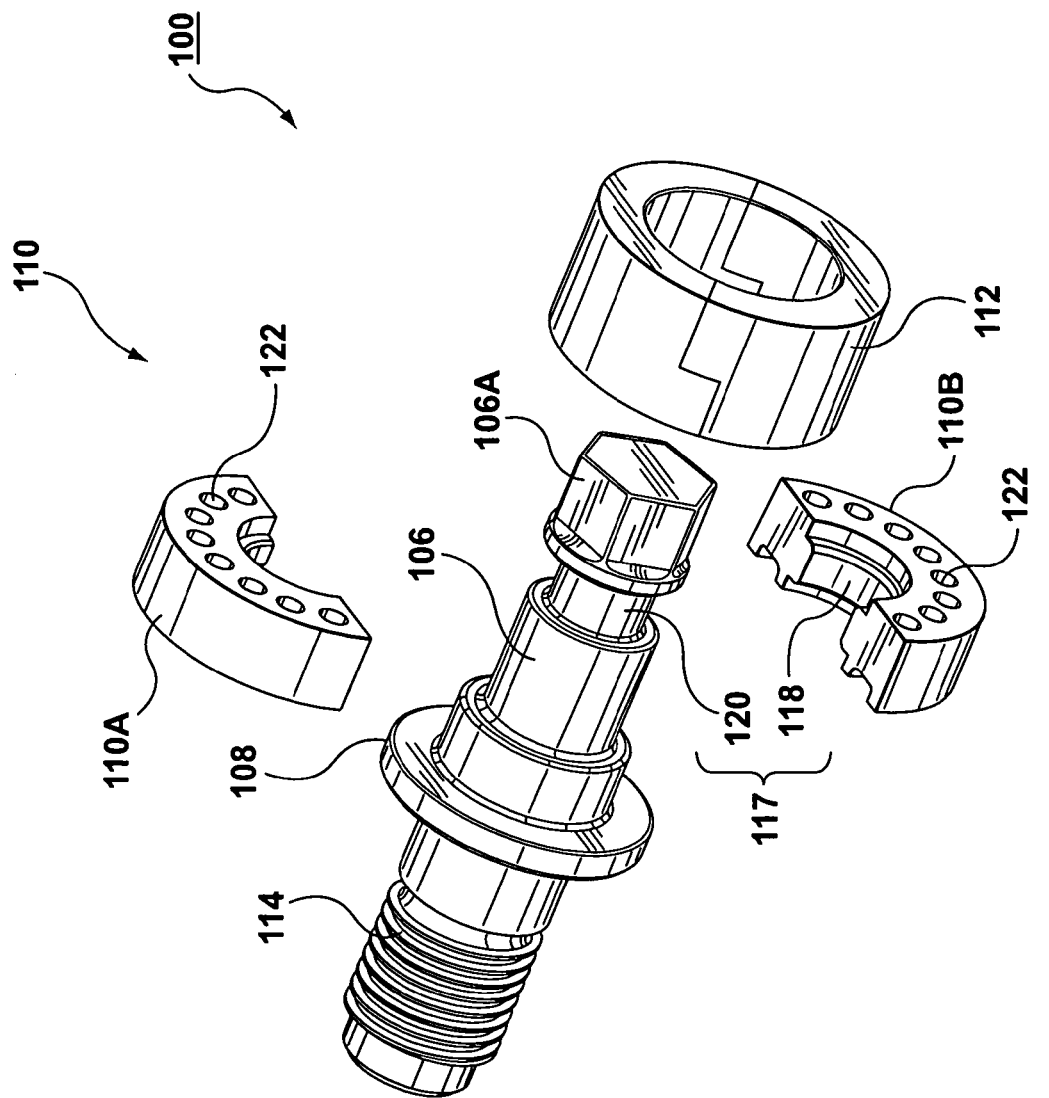

FIG. 1B shows the retainer 110 depicted in a state during the injection cycle of the molding system 10, in which the screw 102 moves the molding material in the accumulation zone into the mold. The ring 112 has been made to abut the rearward retainer 108 so that there is: (i) a gap 111 between the ring 112 and the retainer 110, and (ii) no gap between the ring 112 and the rearward retainer 108.

FIG. 1C is an exploded view of the valve 100. Preferably, the knockdown retainer 110 includes knockdown pieces 110A, 110B. The knockdown pieces (also called "the pieces of the retainer") 110A, 110B are held together by a non-positive attachment. Preferably, the pieces of the retainer 110A, 110B are constrained to stay together when they are position within the barrel 104. Preferably, the retainer pieces 110A, 110B are not fixedly attached to each other (such as with a bolt). The retainer 110 is easily separable into multiple pieces or multiple sections (that is, retainer pieces 110A, 10B; that is, a plurality of retainer pieces).

Preferably, the knockdown joint 117 joins the retainer 110 with the stem 106 so that the retainer 110 is knocked down or off from the stem 106. The knockdown joint 117 also permits slidably fitting or mating of the retainer 110 with the stem 106, but in a non-positive manner (that is, by not using bolts, etc, to firmly and positively bolt or attach the retainer 110 with the stem 106). The knockdown joint 117 includes a slide-type joint, which includes: (i) a tongue 118, and (ii) a groove 120 that is slide matable (slip engagable) with the tongue 118. The tongue 118 extends from at least one retainer piece 110A, 110B. The stem 106 defines the groove 120 (preferably, the groove 120 is defined around an outer surface of the stem 106). The knockdown joint 117 assists in maintaining the retainer 110 in a substantially constant axial position relative to the stem 106. When the retainer 110 is installed in the barrel 104, the radial position of the retainer 110 is held constant by the inner wall of the barrel 104.

When the valve 100 is installed in the barrel 104: (i) an outer diameter of the retainer 110 abuts (or is proximate to) an inner diameter of the barrel 104, and (ii) the retainer 110 maintains its relative (axial) position with the stem 106 while the valve 100 operates.

Figure 1D:
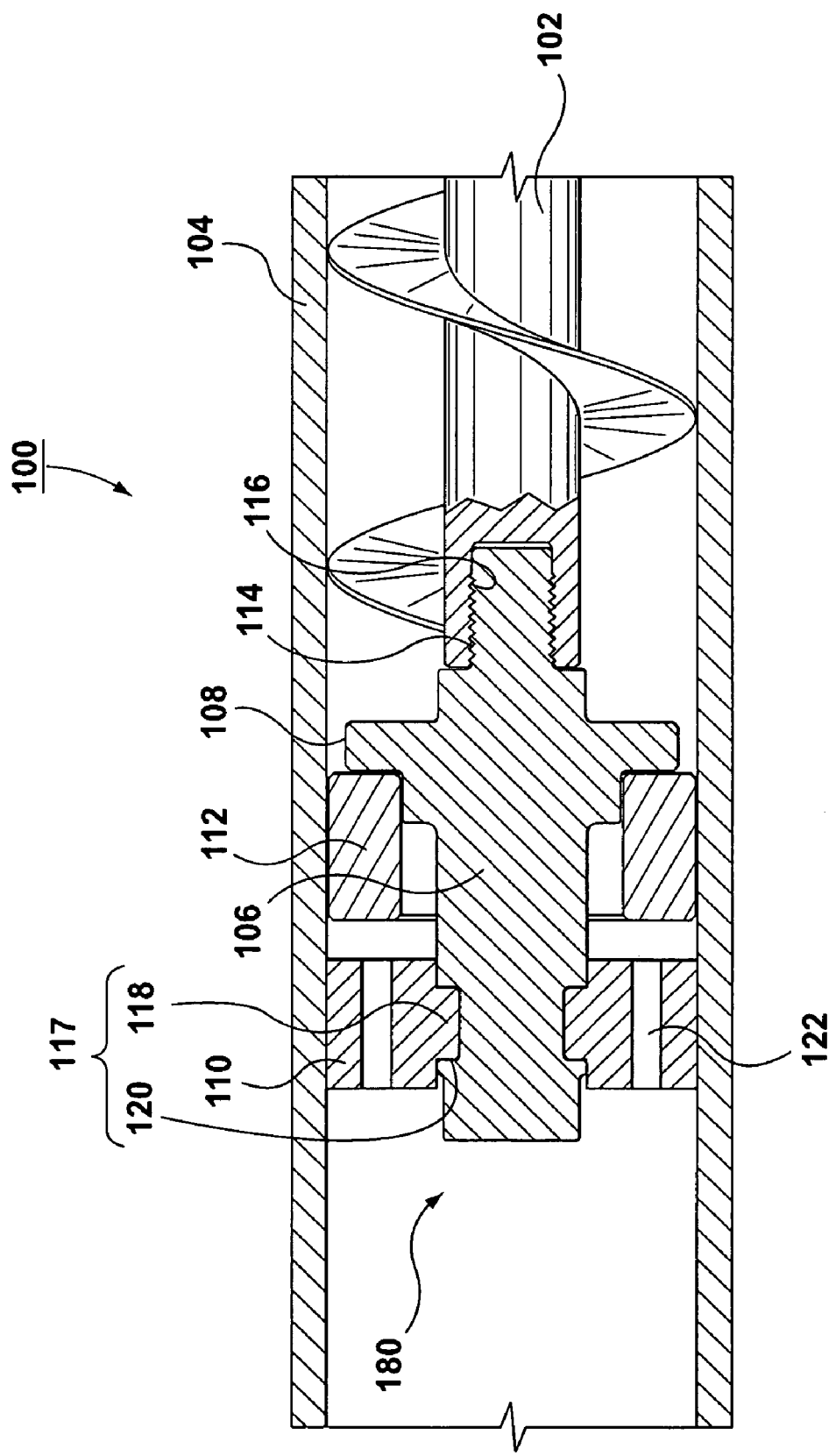

FIG. 1D is a cross-sectional view of the valve 100 of FIG. 1A. In operation, the screw 102 is made to rotate and to force a molding material into the valve 100 and through the melt passage 122. Once a predetermined amount of molding material has entered the accumulation zone, the screw 102 stops rotating and the screw 102 is thrust forwardly to force the valve 100 to close (the ring 112 is made to abut the rearward retainer 108) and thus the molding material is pushed out from the accumulation zone, through a nozzle (not depicted) and into a mold cavity (not depicted). During injection the ring 112 abuts the rearward retainer 108 to prevent backflow of molding material from the valve 100 towards the screw 102. Following injection, the screw 102 is retracted so that: (i) the rearward retainer 108 slides away from the ring 112 and (ii) the ring 112 is made to abut the retainer 110, which then opens the valve 100 and allows molding material to pass through the valve 100 and into the accumulation zone 180.

According to a variant, a tongue extends from a selected one piece of the retainer 110, through a bore in the stem 106 and engages a groove defined by another selected piece or section of the retainer 110.

To clean or replace the components of the valve 100, the barrel 104 is disconnected from the nozzle (not depicted). The screw 102 is moved forwardly such that the valve 100 exits the barrel 104. Since the slide-type joint is a non-positive attachment, the retainer 110 is readily removable from the stem 106. In instances where a significant amount of molding material maintains the retainer 110 attached to the stem 106, a rubber mallet may be used to strike and thereby disengage the retainer 110 from the stem 106. Once the retainer 110 is removed, additional components of the valve 100 may be accessed, cleaned and reinstalled or replaced by equivalent components. Following replacement of components and reinstallation of the pieces of the retainer 110 (which may also be called a "multi-part forward end"), the screw 102 is retracted into the barrel 104, the barrel 104 is closed and preparation for a subsequent cycle of the molding system 10 may begin.

Certain molten metals and metallic alloys (such as magnesium) used in thixomolding and/or metal molding react with oxygen at a temperature above the solidius temperature. As a result, a more involved process is required for replacement of valve components in a thixomolding system or a metal molding system since direct exposure of the metal alloy to air may cause the metal to burn. Replacement of valve components in a thixomolding or metal molding application is further discussed in the descriptions of FIGS. 5A to 5C.

Figure 2:
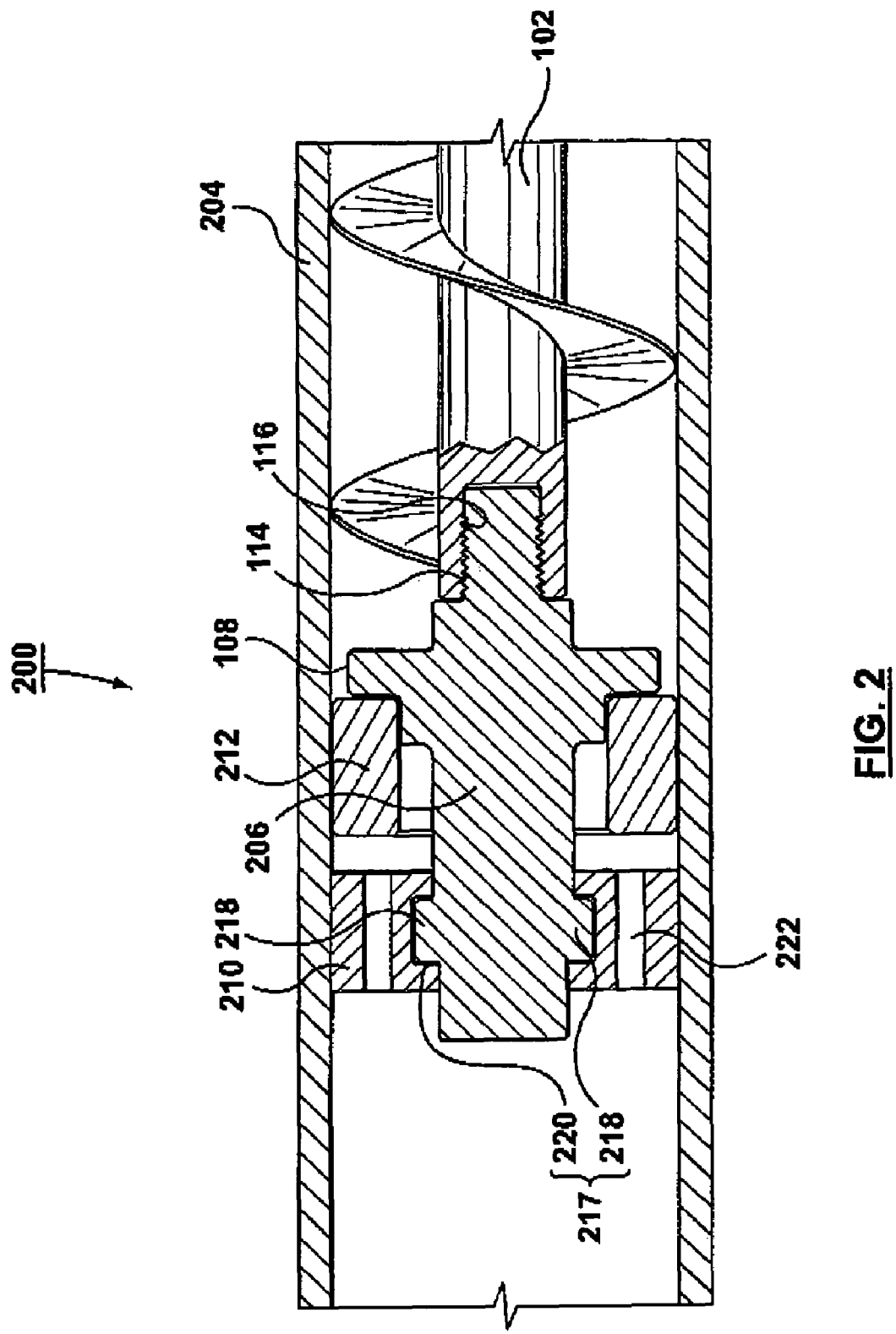
FIG. 2 is a longitudinal cross-sectional view of a molding-system valve according to a second embodiment.

FIG. 2 is a longitudinal cross-sectional view of a valve 200 (hereinafter referred to as "the valve 200") according to the second embodiment. To facilitate an understanding of the second exemplary embodiment, the elements of the second exemplary embodiment (that are similar to those of the first exemplary embodiment) are identified by reference numerals that use a two-hundred designation rather than a one-hundred designation (as used in the first exemplary embodiment). For example, the retainer 210 of the second exemplary embodiment is labeled 210 rather than being labeled 110.

A slide-type joint 217 slidably mates the retainer 210 with a stem 206. The slide-type joint 217 includes a tongue 218 and groove 220. The groove 220 is defined by the retainer 210. The tongue 218 extends from the stem 206, and the tongue 218 is matable with the groove 220 thereby assisting in maintaining the retainer 210 in a substantially constant axial position relative to the stem 206 (once the retainer 210 is inserted into the barrel 204 as the tongue 218 and the groove 220 maintain inter-engagement with each other). The outer diameter of the retainer 210 abuts the inner diameter of the barrel 204 to maintain the pieces or the sections of the retainer 210 in cooperation with each other. Preferably, the outer diameter of the tongue 218 is less than the inner diameter of the ring 212. This arrangement improves ease of assembly of the valve 200.

According to a variation not depicted), the knockdown joint 117, 217 includes multiple tongues and grooves so that: (i) some tongues extend from the retainer 110, 210 while other tongues extend from the stem 106, 206, and (ii) some grooves are defined by the retainer 110, 210 while other grooves are defined by the stem. 106, 206.

Figure 3:
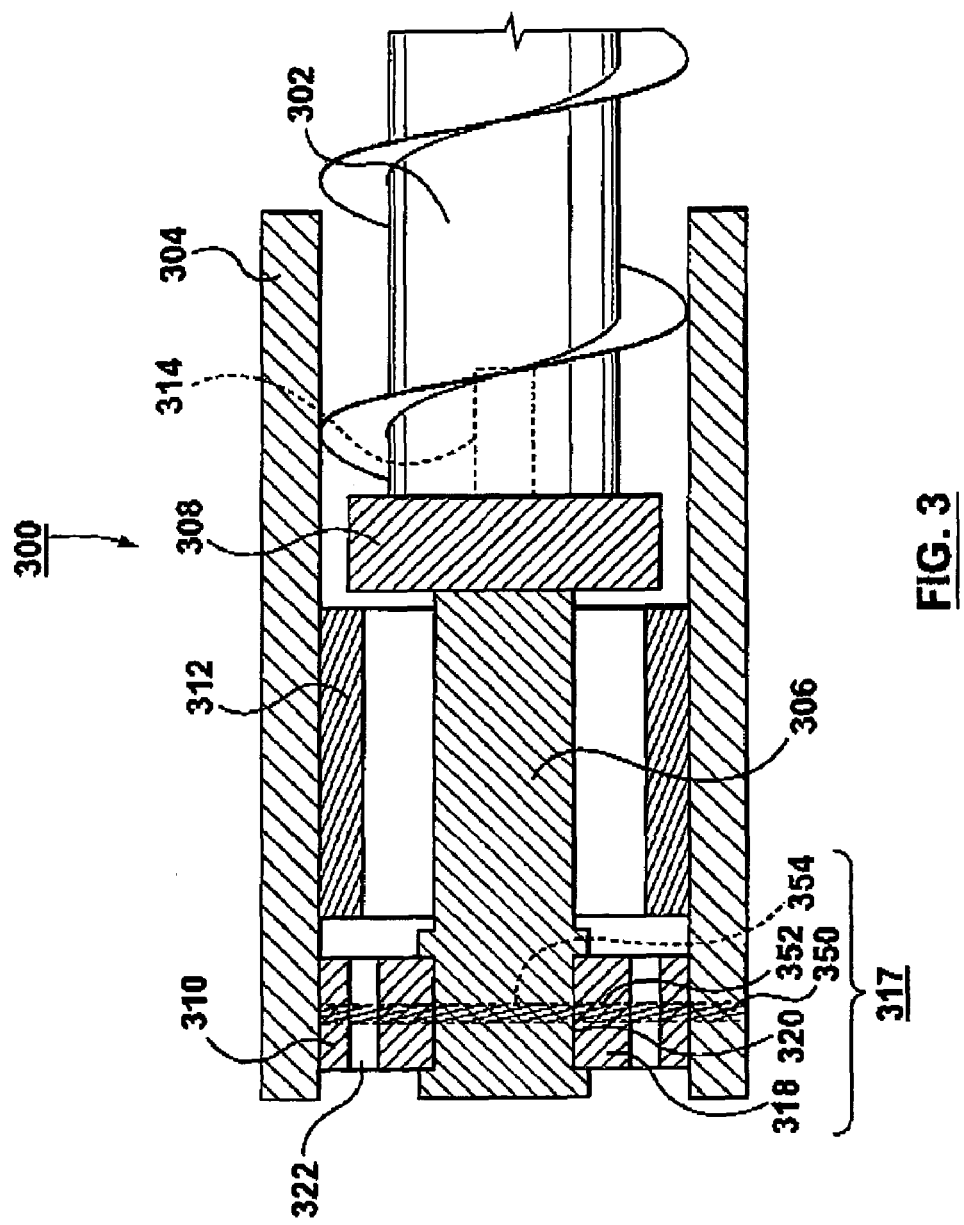
FIG. 3 is a longitudinal cross-sectional view of a molding-system valve according to a third embodiment.

FIG. 3 is a longitudinal cross-sectional view of a valve 300 (hereinafter referred to as "the valve 300") according to the third embodiment. To facilitate an understanding of the third exemplary embodiment, elements of the third exemplary embodiment (that are similar to those of the first exemplary embodiment) are identified by reference numerals that use a three-hundred designation rather than a one-hundred designation (as used in the first exemplary embodiment). For example, the retainer 310 of the third exemplary embodiment is labeled 310 rather than being labeled 110.

The slide-type joint 317 (optionally) includes a tongue 318 and groove 320. The groove 320 is defined around the outer surface of the stem 306. The width of the groove 320 is configured to accommodate the full width of the retainer 310. The tongue 318 extends from the retainer 310.

A profile shape of the tongue 118, 218, 318 and of the groove 120, 220, 320 may be any one of a sharp-edged rectangular profile, a round-edged rectangular profile, a semi-circular profile, and a wedge-like profile.

Preferably, the knockdown joint 317 includes a dowel 350. The dowel 350 is used to engage (in a knockdown approach): (i) engage the retainer 310 to the stem 306, and/or (ii) engage the retainer 310 to the stem 306. The following are variants of the dowel 350: (i) the retainer 310 defines a retainer bore 352, the stem 306 defines a stem bore 354, and a dowel 350 extends into the retainer bore 352 and into the stem bore 354, (ii) the retainer 310 defines the retainer bore 352, and a stem dowel (not depicted) extends from the stem 306 into the retainer bore 352, and/or (iii) the stem 306 defines the stem bore 354, and a retainer dowel (not depicted, but it is a modified dowel 350) extends from the retainer 310 into the stem bore 354.

According to a variant, the knockdown retainer 310 includes a unitary body (structure) that is joined to the stem 306 by a dowel 350.

Figure 4:
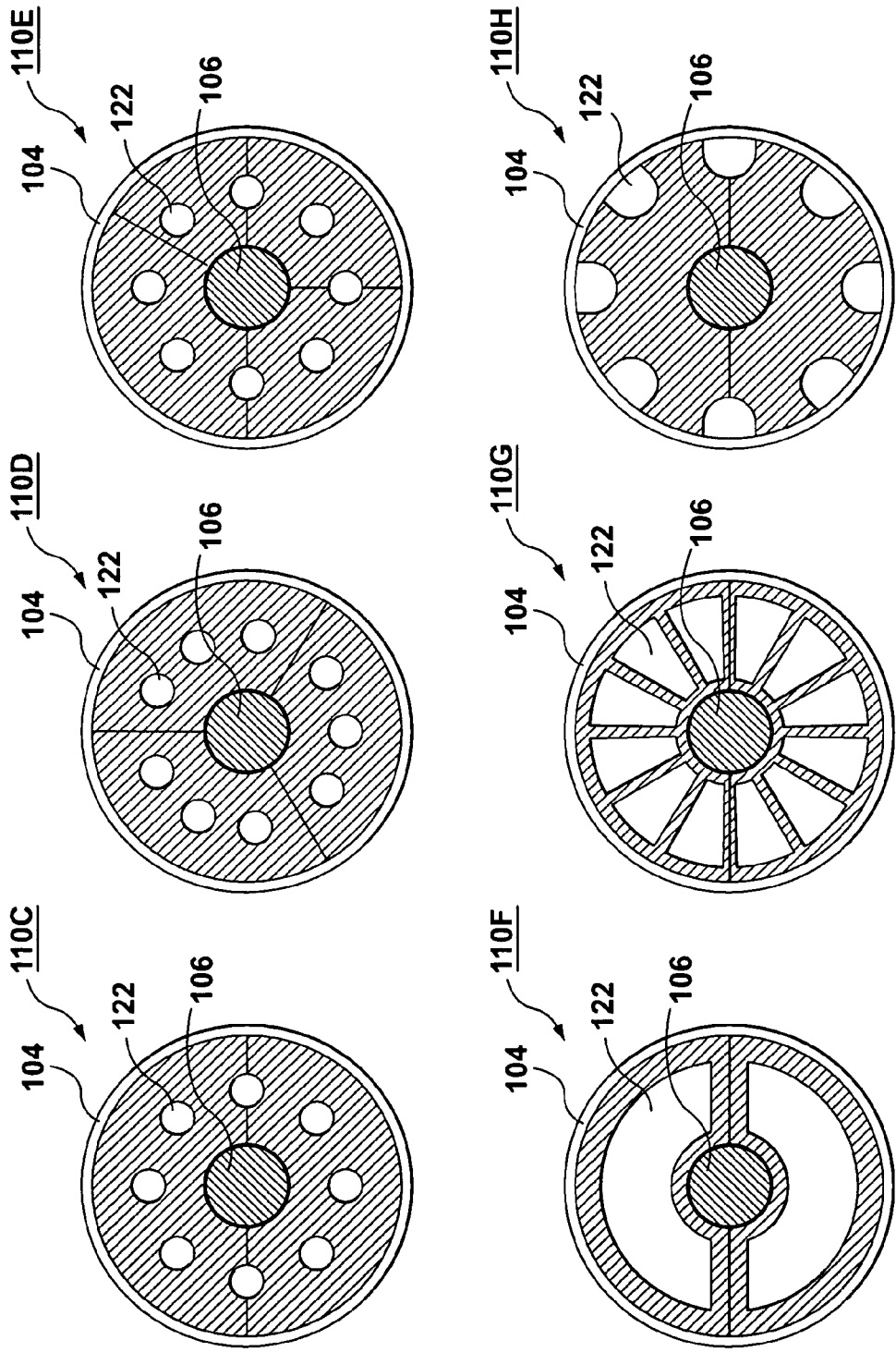
FIG. 4 depicts frontal views of variants of the molding-system valve of FIG. 1.

FIG. 4 depicts frontal views of variants of the valve 100 of FIG. 1. The variant retainers 110C, 110D, 110E, 110F, 110G, 110H include (but other variants are not limited to) a 2-piece construction, a 3-piece construction or a 4-piece construction. The retainers 110C, 110D include retainer pieces (two and three respectively) that are substantially equal in size. The retainer 110E includes retainer pieces (four pieces) that are unequal in size. The variant retainers 110C, 110D, 110E depict the melt passage 122, 222, 322 defined as being circular in shape. The variant retainers 110F, 110G depict the melt passage 122 defined as being arcuate shaped. The variant retainer 110G depicts the melt passage 122 defined as being defined in part by the barrel 104.

Figure 5A:
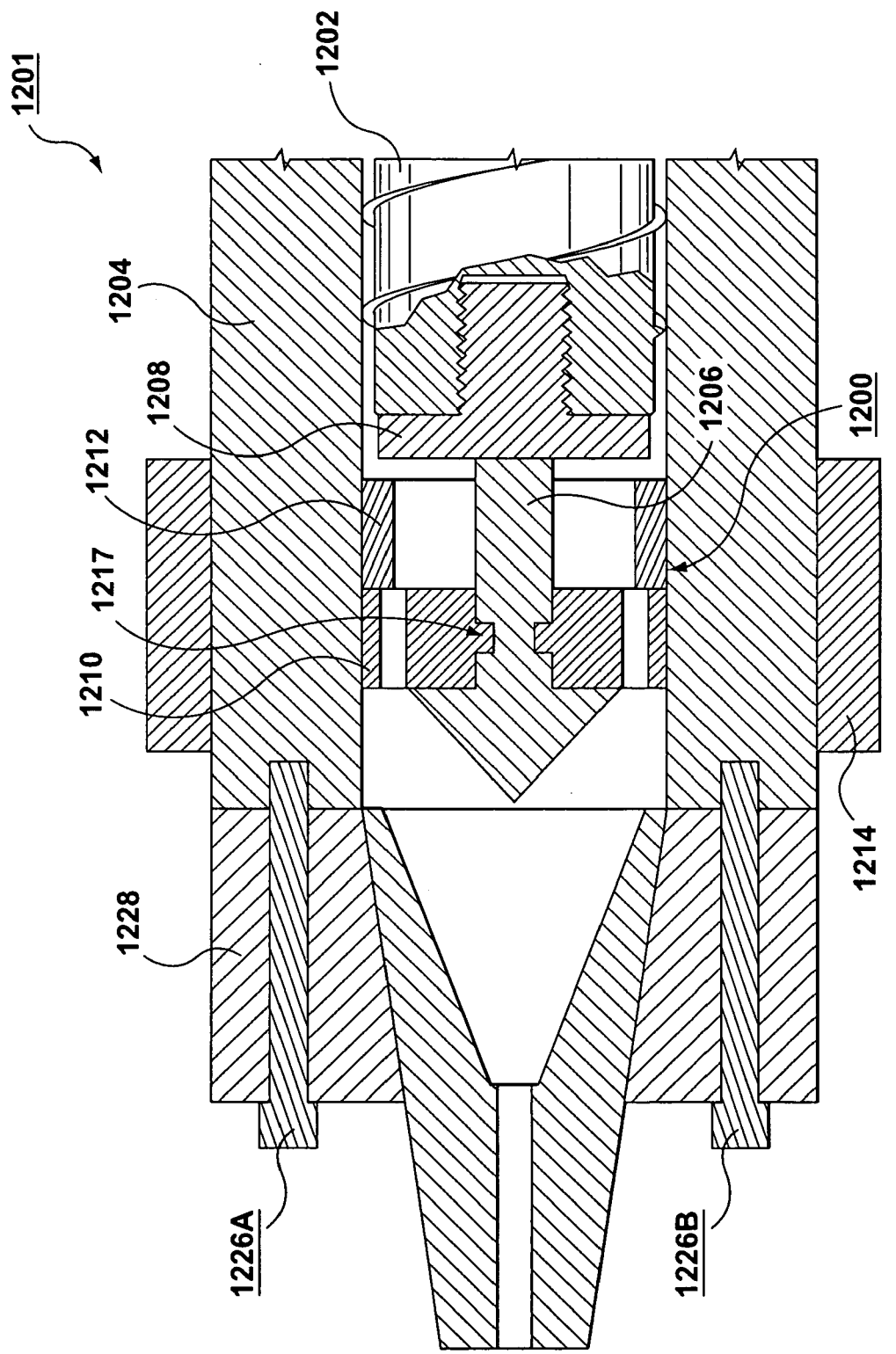
FIGS. 5A to 5C are longitudinal cross-sectional views of the molding-system valve of FIG. 1, according to a fourth exemplary embodiment, used in a barrel of a metal-molding system.
Figure 5B:
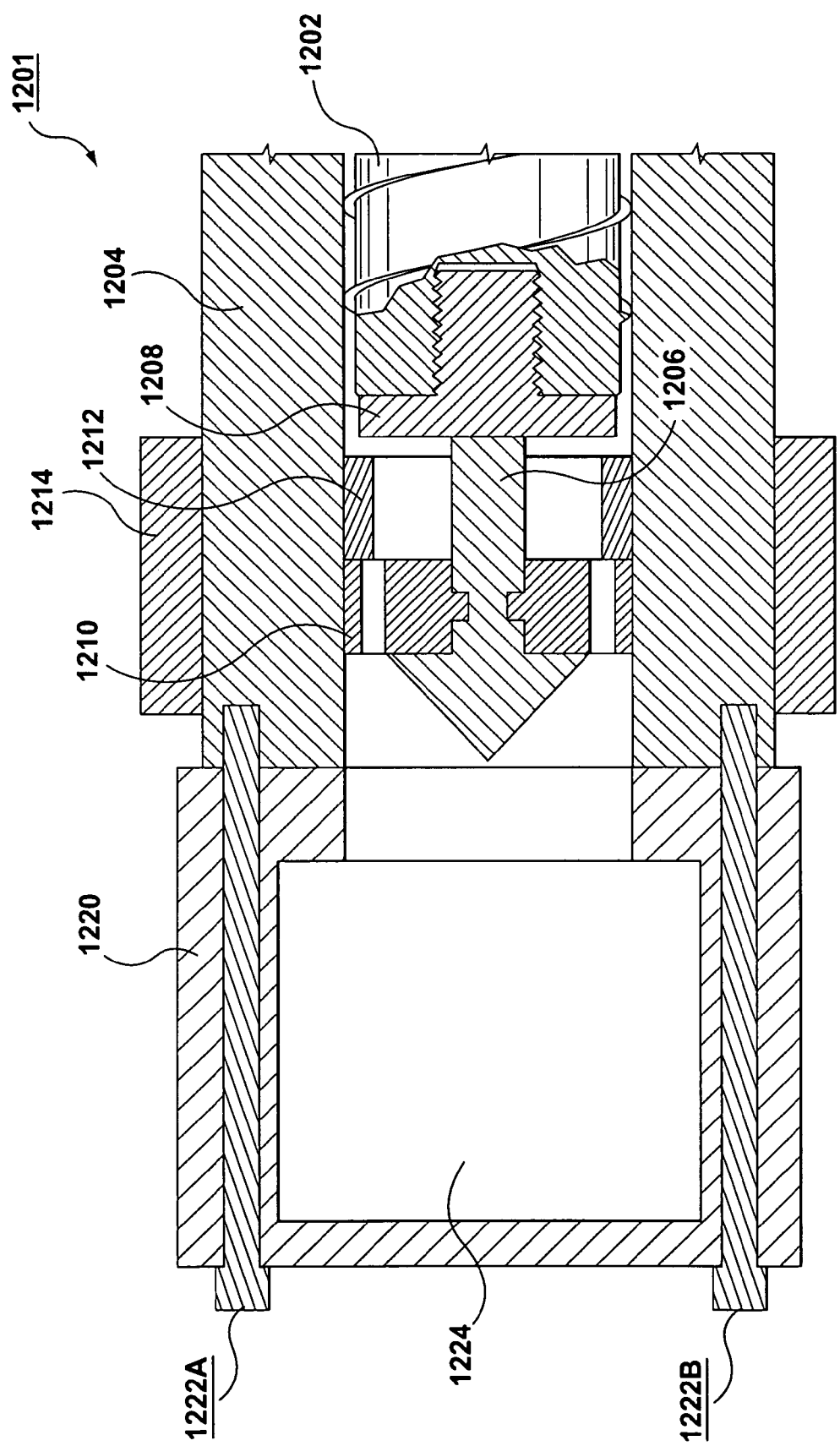
Figure 5C:
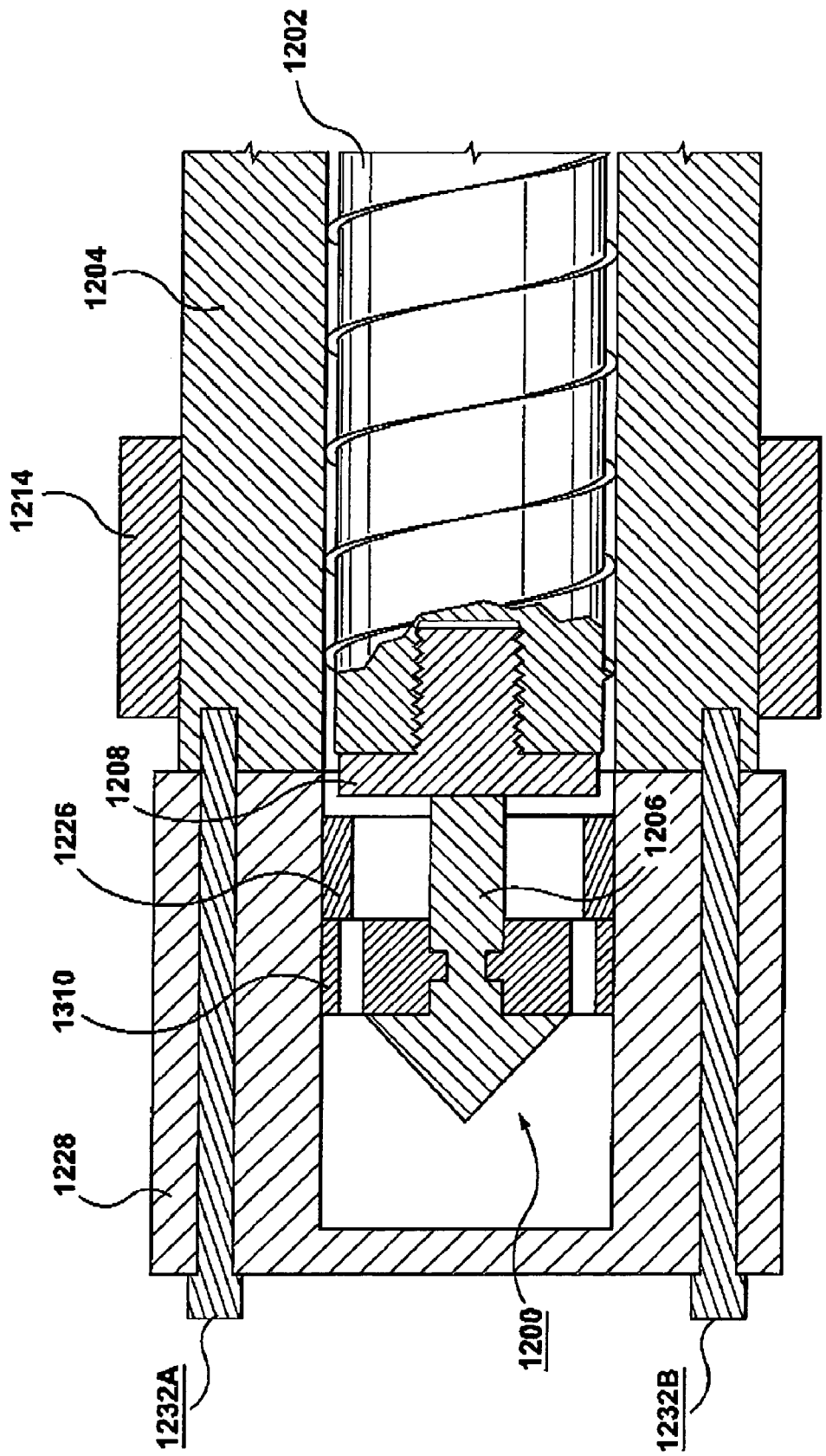

FIGS. 5A to 5C are longitudinal cross-sectional views of the valve 1200 of FIG. 1 used in a barrel of a metal-molding system (preferable, a thixo-molding system 1201). The valve 1200 is according to the fourth exemplary embodiment. To facilitate an understanding of the fourth exemplary embodiment, elements of the fourth exemplary embodiment (that are similar to those of the first exemplary embodiment) are identified by reference numerals that use a twelve-hundred designation rather than a one-hundred designation (as used in the first exemplary embodiment). For example, the retainer 1210 of the fourth exemplary embodiment is labeled 1210 rather than being labeled 110. As previously mentioned, FIGS. 5A to 5C depict a method of replacing valve components of a valve 100 that is operatively connected to a molding system 10, particularly of a thixo-molding system.

FIG. 5A is a longitudinal cross-sectional view of a distal end of a barrel 1204 of the thixo-molding system 1201. A heater 1214 is coupled to the barrel 1204. A barrel head 1228 (also called a "cover") is attached to the barrel 1204 by a set of bolts 1226A, 1226B. The barrel 1204 houses a screw 1202 for processing a molding material (such as a metallic molding material). The valve 100 is attached to the distal end of the screw 1202. Any one of the valves 100, 200 or 300 may be attached to the screw 1202.

To begin replacing components of the valve 100, the temperature of a distal end of the barrel 1204 is lowered by reducing or turning off the output of the heater 1214. As the metal molding material cools and solidifies within the valve 100, the remainder of the material within the barrel 1204 is kept (maintained) in non-solid state by maintaining other heaters (not depicted) operational. The solidifying molding material proximate to the valve 100 is permitted to weld the valve 100 to the barrel 1204, and in response a seal is created. The seal blocks oxygen from entering the barrel 1204 and reaching the molten molding material contained in the barrel 1204 once the barrel head 1228 is removed from the barrel 1204. Since the seal created by the solidified material is airtight, the bolts 1226A, 1226B can be loosened and the barrel head 1228 may then be removed without incurring risk of exposing the molten molding material (melt located behind the seal and in the barrel) to air, whereupon it could ignite.

FIG. 5B is a longitudinal cross-sectional view of the distal end of the barrel 1204 of a FIG. 5A following removal of the barrel head 1228. After the barrel head 1228 is removed from the barrel 1204, a valve-service cap 1220 (hereafter referred to as "the cap 1220") is installed to the barrel 1204. The cap 1220 is: (i) attached to the distal end of the barrel 1204 by a set of removal cap screws 1222A, 1222B, and/or (ii) is preferably made of a weld-proof material (that is, the material does not become welded to the molding material) such as a highly-thermally resistant plastic or rubber. The cap 1220 (also called a cap) defines a catch basin 1224, and the cap 1220 is used to receive the valve 100. Preferably, the cap 1220 is filled with an inert gas, such as argon, prior to installation of the cap 1220 onto the barrel 1204. The inert gas does not react to molten metallic molding material (such as magnesium, etc). Alternatively, a port (not depicted) extends from the cap 1220 so that the inert gas may enter the cap 1220 after the cap 1220 has been installed to the barrel 1204.

Once the cap 1220 is installed, the heater 1214 is made to supply heat to the distal end of the barrel 1204, increasing the temperature and returning the solidified material located proximate to the valve 100 to a molten (non-solid) state. The inert gas does not react with the molten metallic alloy. When the solidified material within the valve 100 returns to a molten state, the screw 1202 is translated forwardly, pushing the valve 100 into the catch basin. The heater 1214 is turned off so as to re-solidify the molten molding material located in the distal end of the screw 1202 and the barrel 1204. The solidified melt creates an airtight seal around the distal end of the screw 1202 and the barrel 1204 to thus prevent air from entering into the barrel 1204. The removal cap screws 1222A, 1222B are then loosened and the cap 1220 is detached or removed from the barrel 1204. At this point, the valve 100 protrudes out of the distal end of the barrel 1204 allowing service access to components of the valve 100, such as the ring 112, which can be inspected, removed, cleaned and/or replaced, etc. Since the retainer 110 is non-positively engaged to the stem 106 (that is, it is knockably removable from the stem 106), the retainer 110 falls off of the stem 106. At times, the retainer 110 may not simply fall off the stem 106 since solidified molding material may still remain at the interfaces between the retainer 110 and the stem 106. In such situations, the retainer 110 can be disengaged from the valve 100 once the valve has been made to protrude from the distal end of the barrel 1204 by striking the retainer 110 with a rubber mallet or similar device (once all the melt has solidified and the catch basin is removed).

FIG. 5C is a longitudinal cross-sectional view of the distal end of the barrel 1204 of a FIG. 5A following replacement of the components of the valve 100. The ring 112 and the retainer 110 have been replaced by a new ring 1226 and a new retainer 1310 respectively. In this manner, the entire valve 100 does not need to be removed from the screw 1202 (or the screw from the barrel). The new retainer 1310 is held in place, by a clamp or other retention means (not depicted), as the cap 1220 is slid over the valve 100. Once the installation cap has been fit over a portion of the new retainer 1310, the clamp or other retention means can be removed and the cap 1220 can be made to abut the distal end of the barrel 1204 thereby encapsulating the valve 100. Installation cap screws 1232A and 1232B attach the cap 1220 to the barrel 1204.

Following attachment of the cap 1220, (i) the cap is pumped with inert gas and (ii) output of the heater 1214 is increased to melt the solidified melt located in the distal end of the barrel 1204. The screw 1202 is retracted when the solidified melt has sufficiently melted, pulling the valve 100 within the barrel 1204. Once the valve 100 is sufficiently within the barrel 1204, the output of the heater 1214 is once again reduced in the distal end of the barrel 1204 to create a seal of solidified melt. The cap 1220 is then removed and replaced by the barrel head 1228 of FIG. 5A. Once the barrel head 1228 is installed, the heater 1214 is used to melt the solidified melt within the barrel 1204, allowing normal operation of the thixomolding system to resume normal operation.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims.

What is claimed is:

1. A molding-system valve for use with a screw being received in a barrel of a molding system, the molding system being configured to process a molten molding material, the molding-system valve comprising:
   a stem being configured to extend from the screw, the stem having a stem tip;
   a check ring defining a bore, the bore receiving the stem;
   a retainer extending from the stem, the retainer being offset from the stem tip of the stem; and
   a knockdown retainer being located proximate the stem tip of the stem, the knockdown retainer being located offset from the retainer, the knockdown retainer and the retainer cooperating to permit limited stroking of the check ring between the knockdown retainer and the retainer, the knockdown retainer defining a melt passage extending through the knockdown retainer, the knockdown retainer including:
      knockdown pieces being: (i) interleaved with each other, and (ii) interleaved with the stem, and after translating the screw so that the molding-system valve becomes pushed out from the barrel so that the stem, the check ring, the retainer and the knockdown retainer become exposed, the knockdown pieces being knocked down by striking the knockdown pieces so that the knockdown pieces become disengaged from each other, from the stem, and from the check ring.

2. The molding-system valve of claim 1, wherein:
the knockdown pieces are knockdown joinable with each other.

3. The molding-system valve of claim 1, wherein:
the knockdown retainer and the stem are joinable by a knockdown joint.

4. The molding-system valve of claim 1, wherein:
the knockdown retainer and the stem are joinable by a knockdown joint, the knockdown joint includes:
   a groove defined by the knockdown retainer; and
   a tongue extending from the stem, and the tongue being engagable with the groove.

5. The molding-system valve of claim 1, wherein:
the knockdown retainer and the stem are joined by a knockdown joint, the knockdown joint includes:
   a groove defined by the stem; and
   a tongue extending from the knockdown retainer, and the tongue being engagable with the groove.

6. The molding-system valve of claim 1, wherein:
the knockdown retainer and the stem are joined by a knockdown joint, the knockdown joint includes:
   a retainer bore being defined by the knockdown retainer;
   a stem bore being defined by the stem; and
   a dowel being extendable into the retainer bore and the stem bore.

7. The molding-system valve of claim 1, wherein:
the knockdown retainer and the stem are joined by a knockdown joint, the knockdown joint includes:
   a retainer bore defined by the knockdown retainer; and
   a stem dowel extending from the stem, and the stem dowel being extendable into the retainer bore.

8. The molding-system valve of claim 1, wherein:
the knockdown retainer and the stem are joined by a knockdown joint, the knockdown joint includes:
   a stem bore defined by the stem; and
   a retainer dowel extending from the knockdown retainer, and the retainer dowel being extendable into the stem bore.

9. The molding-system valve of claim 1, wherein:
the knockdown pieces are held together by a non-positive attachment.

10. The molding-system valve of claim 1, wherein:
the knockdown pieces are knockdown joinable to the stem.

11. The molding-system valve of claim 1, wherein:
the knockdown pieces are constrained to stay together when they are position within the barrel.

12. The molding-system valve of claim 1, wherein:
the knockdown pieces are held together by a non-positive attachment.

13. The molding-system valve of claim 1, wherein:
the knockdown pieces and the stem are joined by a knockdown joint.

14. The molding-system valve of claim 1, wherein:
the knockdown pieces and the stem are joined by a knockdown joint, and the knockdown joint includes:
   a slide-type joint, including:
      a tongue; and
      a groove being slide engagable with the tongue, the tongue extending from at least one of the knockdown pieces, the stem defining the groove, and the slide-type joint maintaining the knockdown retainer in a substantially constant axial position relative to the stem.

15. The molding-system valve of claim 1, further comprising:
   a slide-type joint slidably mating the knockdown retainer with the stem, the slide-type joint including:

a tongue; and a groove being defined by the knockdown retainer, the tongue extending from the stem, and the tongue being matable with the groove thereby assisting in maintaining the knockdown retainer in a substantially constant axial position relative to the stem, once the knockdown retainer is inserted into the barrel as the tongue and the groove maintain inter-engagement with each other, the outer diameter of the knockdown retainer abuts the inner diameter of the barrel to maintain the knockdown pieces in cooperation with each other.

16. The molding-system valve of claim 1, further comprising:

a slide-type joint including:

a tongue; and a groove being defined around an outer surface of the stem, a width of the groove being configured to accommodate a full width of the knockdown retainer, the tongue extends from the knockdown retainer; and a dowel being configured to: (i) engage the knockdown retainer to the stem, and (ii) engage the knockdown retainer to the stem.

17. The molding-system valve of claim 1, wherein:

the molding system also includes a barrel head and a cap;

the molten molding material is permitted to become solidified so that the molten molding material welds the molding-system valve to the barrel, and in response a seal is created, and the seal blocks oxygen from entering the barrel and reaching the molten molding material contained in the barrel;

a remainder of the molten molding material within the barrel is maintained in non-solid state;

the barrel head is removed from the barrel once the seal is airtight so that the molten molding material behind the seal and in the barrel is not exposed to air;

the cap is installed to the barrel;

a distal end of the barrel is heated up, and in response solidified material located proximate to the molding-system valve is returned to a molten state;

the screw is translated forwardly so that the molding-system valve is pushed into the cap;

solidification of the molten molding material is permitted to seal off the barrel, and the molten molding material becomes solidified so that the knockdown pieces become welded to each other; and the molding-system valve is serviced by: (i) removing the cap to expose the stem, the check ring, the retainer and the knockdown retainer, and (ii) knocking down the knockdown retainer by striking the knockdown pieces so that the knockdown pieces become disengaged from each other, from the stem, and from the check ring.

* * * * *